United States Patent [19]

Anton

[11] Patent Number: 4,810,942

[45] Date of Patent: Mar. 7, 1989

[54] METHOD OF CONTROLLING AT LEAST ONE ELECTRIC MOTOR ON AN OFFSET PRINTING MACHINE

[75] Inventor: Rodi Anton, Leimen, Fed. Rep. of Germany

[73] Assignee: Heidelberger Druckmaschinen AG, Heidelberg, Fed. Rep. of Germany

[21] Appl. No.: 870,227

[22] Filed: Jun. 3, 1986

[30] Foreign Application Priority Data

Jun. 3, 1985 [DE] Fed. Rep. of Germany ....... 3519840

[51] Int. Cl.[4] ............................................... H02P 7/00

[52] U.S. Cl. .................................... 318/327; 318/317; 318/333; 318/334; 318/459

[58] Field of Search ............... 318/317, 327, 332, 334, 318/333, 342, 309, 310, 459, 479, 561; 361/33, 30, 25

[56] References Cited

U.S. PATENT DOCUMENTS

| | | | |
|---|---|---|---|
| 3,936,711 | 2/1976 | Gay | 318/317 |
| 4,345,189 | 8/1982 | Kukaya | 318/332 |
| 4,541,747 | 9/1985 | Imaizumi | 318/334 |
| 4,550,277 | 10/1985 | Carney | 318/334 |
| 4,611,682 | 9/1986 | Yasuda | 318/334 |
| 4,626,753 | 12/1986 | Letterman | 318/334 |

*Primary Examiner*—Bentsu Ro

*Attorney, Agent, or Firm*—Herbert L. Lerner; Laurence A. Greenberg

[57] ABSTRACT

Method of controlling at least one electric motor on an offset printing machine by inputting a set point for the rotational speed, which comprises forming a set point for the rotational speed by means of a device for controlling the electric motor, and reducing the value of the set point as a function of a measured line voltage when the line voltage is inadequate.

4 Claims, 2 Drawing Sheets

INPUT
1Vset
2
Z= 0
3
4
Z= 0?
N
Y
15
Z=1 ?
N
Y
MEASUREMENT
V
5
11
MEASUREMENT
T
16
MEASUREMENT
M
N
M>Mmax?
17
Y
6
V<Kx1Vset ?
N
N
T>Tmax?
12
Y
Y
7
2Vset =K-1x V
14
2Vset = 1Vset
2Vset REDUCED
13
Z+1
8
OUTPUT
2Vset
9
N
Z = 3 ?
10
Y

METHOD OF CONTROLLING AT LEAST ONE ELECTRIC MOTOR ON AN OFFSET PRINTING MACHINE

The invention relates to a process for controlling at least one electric motor on an offset printing machine by prescribing or inputting a set point for the rotational speed.

Specific requirements are made with respect to the control behavior of the drive system when controlling electric motors on printing machines. An important application is the control of the rotational speed. The objective thereof is to set and maintain as exactly as possible a particular rotational speed for the electric motor by prescribing or inputting a set point or nominal value. Prescribing or inputting the set point for the rotational speed can be achieved, for example, with the aid of a potentiometer (note: Zach, Franz: Power Electronics: Components, Power Circuits, Control Circuits, Influences; Springer Verlag Vienna, New York, 1979).

Certain requirements are also made with respect to such drive controls for printing machines in relation to the properties of the power supply, the cooling of the component units and the load conditions (note: Allgemeine Elektricitaets-Gesellschaft AEG-Telefunken, Berlin, Frankfurt, 1979: Kolb, Otto, Rectifier Technology Vol. 1, AT Verlag, Arau, Stuttgart, 1984: Hartel, Walter: Rectifier Circuits, Springer Verlag, Berlin Heidelberg, New York, 1977). If these requirements are not met, there is then a likelihood of operational failures which have an effect upon the final printed product, or at least undesirable production downtimes of the printing machines.

It is an object of the invention to provide a method of maintaining production of a printing machine when border conditions such as inadequate voltage, increased ambient and motor temperatures, respectively, and increased moment demand with the maximum possible printing capacity, exist.

With the foregoing and other objects in view, there is provided, in accordance with the invention, a method of controlling at least one electric motor on an offset printing machine by inputting a set point for the rotational speed, which comprises forming a set point for the rotational speed by means of a device for controlling the electric motor, and reducing the value of the set point as a function of a measured line voltage when the line voltage is adequate. It was hitherto necessary to switch off the drive of the printing press even if the mains or line voltage of the power supply dropped only slightly below the tolerance limit. The rotational speed control in accordance with this invention makes it possible to maintain the production of the printing machine in a so-called emergency operation.

In accordance with another aspect of the invention, there is provided a method of controlling at least one electric motor on an offset printing machine by inputting a set point for the rotational speed, which comprises forming a set point for the rotational speed by means of a device for controlling the electric motor, and reducing the value of the set point as a function of a measured temperature when a permissible temperature is exceeded. For the drives in printing machines having a momentary characteristic curve which decreases as the rotational speed decreases, it is possible to maintain the production of the printing machine by reducing the rotational speed even if the ambient temperature increases dramatically and/or there is a reduction in the cooling capacity of the cooling units of the electric motor. This eliminates any undesired switching-off of these components if a limit temperature is reached.

In accordance with a third aspect of the invention, there is provided a method of controlling at least one electric motor on an offset printing machine by inputting a set point for the rotational speed, which comprises forming a set point for the rotational speed by means of a device for controlling the electric motor, and reducing the value of the set point as a function of a measured temperature when the temperature of the control elements of the electric motor exceeds a permissible temperature. In this way, it is possible to counter a reduction in the cooling capacity of the cooling units of the control elements by decreasing the set point or nominal value of the rotational speed and thus prevent a temporary stoppage of the printing operations.

In accordance with a fourth aspect of the invention, there is provided a method of controlling at least one electric motor on an offset printing machine by inputting a set point for the rotational speed, which comprises forming a set point for the rotational speed by means of a device for controlling the electric motor, and reducing the value of the set point as a function of a measured moment when a permissible momentary demand is exceeded.

Because the current of the electric motor is a function of the load moment, the armature current of the electric motor is determined and the armature voltage reduced if as prescribed current limit is reached, so as to prevent any further increase in the armature current.

It is thus also possible to control the rotational speed of the electric motor with an appropriately reduced armature voltage, which has as a consequence also a reduced drive output. The drive moment is preferably determined at those points which have an effect on the power flow, for example, at drive shafts of electric motors or at those points which are to be reliably protected against overload e.g. dampening units or other consumers which have a momentary demand dependent upon the handling by the operator.

What this means for the operation of a printing works is that the production on the printing machine can be maintained, thus avoiding the troublesome cleaning work on rubber blankets and printing plates with the lengthy shutdown times due to having to switch off the machine, and even preventing such work and shutdowns on the dampening and/or inking units. Advantageously, the set point of the rotational speed can be reduced by the aforementioned influencing parameters or by a combination of these influencing parameters. The determining influencing parameter is always the one which has the greatest effect on the set point of the rotational speed.

Other feature which are considered as characteristic for the invention are set forth in the appended claims.

Although the invention is illustrated and described herein as embodied in method of controlling at least one electric motor on an offset printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figure 1:
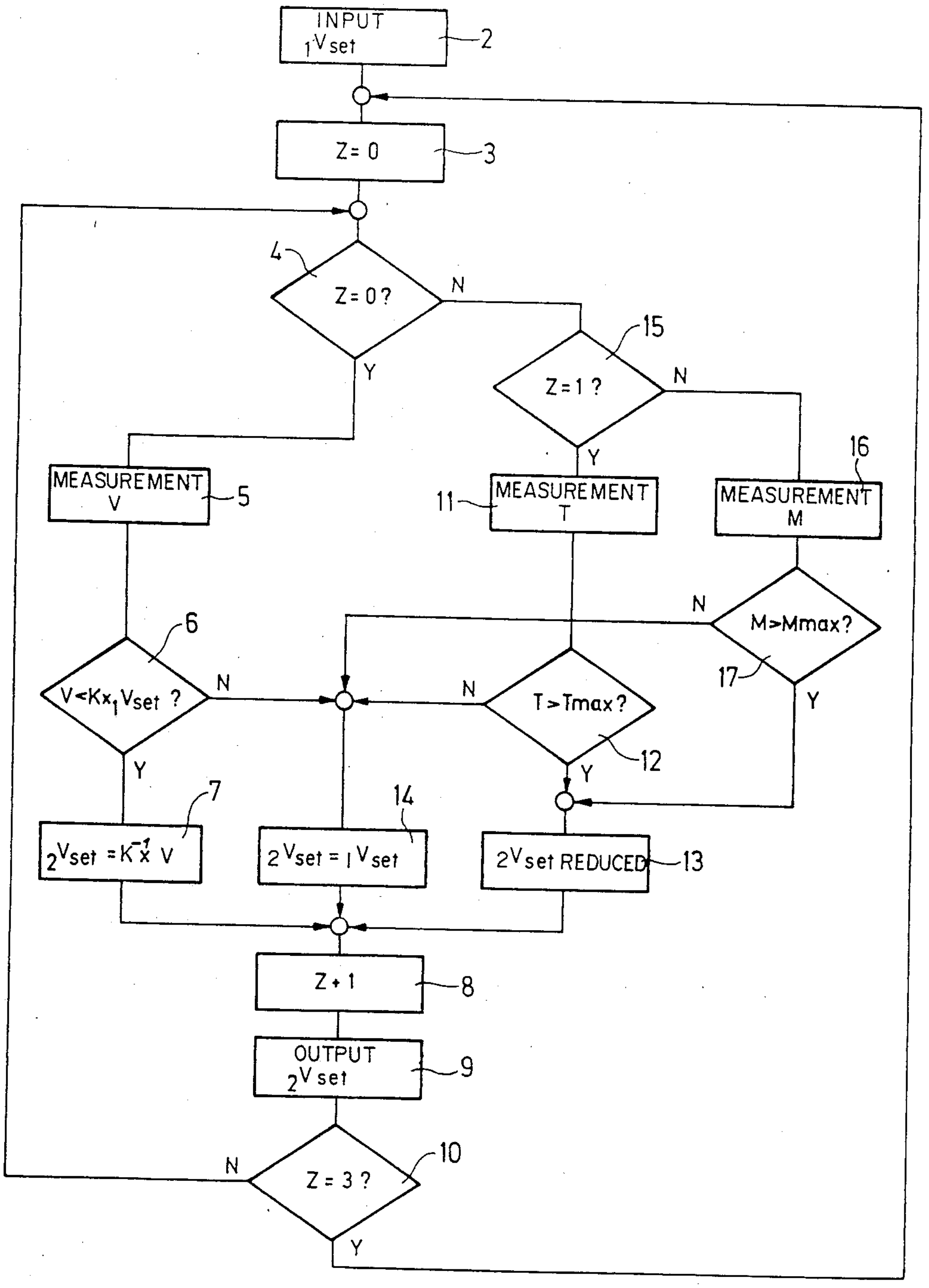
FIG. 1 is a flow chart of the sequence of steps of the method of limiting the rotary speed of a drive motor of a rotary offset printing machine up to the step at which the set point of the motor speed is changed.

Because it is believed that, in the case at hand, the provision of FIG. 1 not only with reference numerals but also with suitable legends relating to the meaning of the individual elements contained in FIG. 1 would aid in a clearer understanding of the description of the invention, FIG. 1 has been presented accordingly.

Referring now the drawing and more particularly, to FIG. 1 thereof, there are shown therein the steps which constitute the method of the invention. A set point or nominal value 2 for the rotational speed is prescribed for the drive in the form of a voltage ${}_1V_{set}$. This set point voltage ${}_1V_{set}$ for the rotational speed has a linear relationship with the desired speed of the driving electric motor. In the next method step the reading Z of a counter is set to "zero". This counter serves solely for explaining the method steps in the flow chart. The counter reading Z is checked in the query 4. Since the counter reading Z at this instant is "0", a measurement 5 of the mains or line voltage $V_N$ is performed. The voltage level is then compared in a decision 6 with the product from the specified rotational speed set point voltage ${}_1V_{set}$ and a factor k. This factor k is a conversion factor and takes into account in value terms the allocation of the rotational speed set point voltage ${}_1V_{set}$ to the maximum armature voltage of the electric motor 31 (FIG. 2) permitted for this drive.

If the supply voltage of the drive is less than this product, a rotational speed set voltage ${}_2V_{set}$ is formed as shown in the block 7, which is a product of the measured mains or line voltage $V_N$ and a factor 1/k. Assurance is thus provided that in the event of an undervoltage, the maximum permissible armature voltage of the electric motor 31 is not exceeded for this drive. This is followed by method step 8.

If the measured supply voltage in decision 6, is not less than the product of k and ${}_1V_{set}$, however, then ${}_2V_{set}$ is set to the same amount as ${}_1V_{set}$. This is then followed by method step 8.

Figure 2:
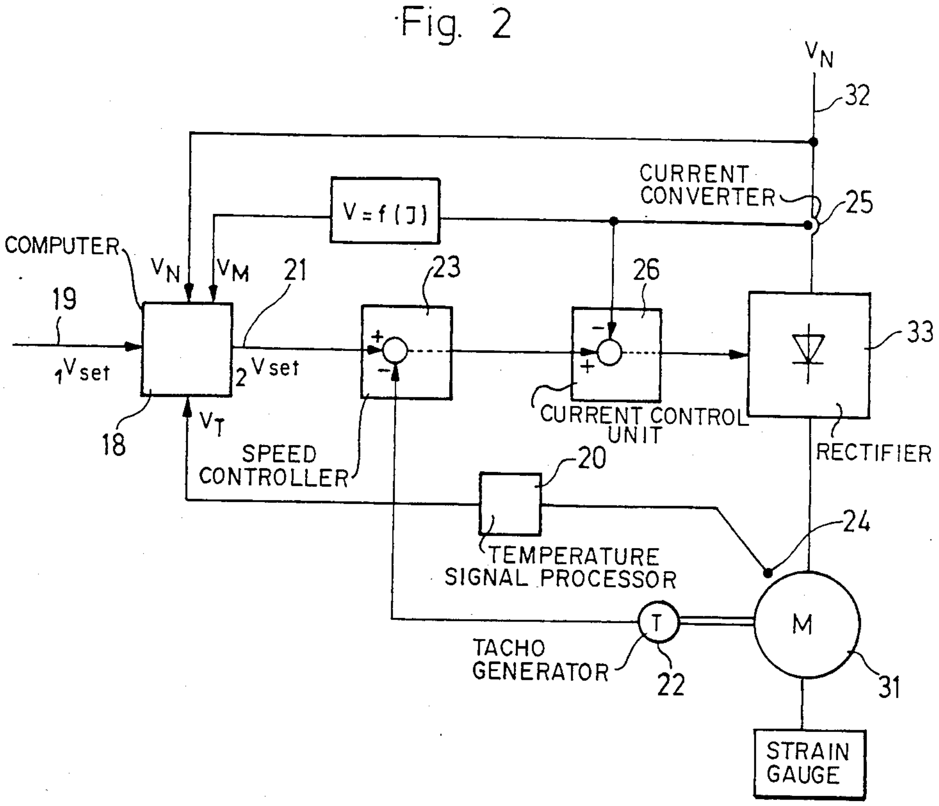
FIG. 2 is a block circuit diagram showing equipment for altering the set point of the motor speed.

In method step 8, the counter reading Z is increased by 1, the set point voltage ${}_2V_{set}$ is then outputted in output 9 and transmitted to the rotational speed controller 23 (FIG. 2). This is followed by interrogating the counter reading 10. Because, as described previously, the counter reading Z is again polled in query 4.

Because the counter reading Z at this instant is "1", in other words unequal to "0", reference is made to decision 15 in which the counter is interrogated for the counter reading Z equal to "1".

Since the counter reading Z is now "1", a temperature T measurement is now performed at 11 and, if the maximum limit temperature $T_{max}$ is exceeded (query 12), the set point voltage ${}_2V_{set}$ is matched in the method step 13 in accordance with the permissible limit temperature. This is followed by method step 8.

In the event the limit temperature $T_{max}$ is not reached in query 12, the set point voltage ${}_2V_{set}$ is then fixed at the same value as ${}_1V_{set}$. This is followed by method step 8 in which the counter reading Z is increased by "1". The set point voltage ${}_2V_{set}$ results in the subsequent output 9.

Because the counter reading Z is "2" following the preceding operation, in other words unequal to "3", the counter reading Z is once again queried or polled in Question 4. Because the counter reading Z at this instant is "2", in other words unequal to "0", reference is made to decision 15 in which the counter is polled for the counter reading Z equal to "1".

Because the counter reading Z is now "2", measurement 16 of a moment M is then performed and, if the maximum drive moment $M_{max}$ is exceeded (decision 17), the set point voltage ${}_2V_{set}$ is reduced in the method step 13 by a fixed amount which inter alia is dependent upon the moment characteristic curve of the existing load. This is followed by method step 8. In the event that the maximum drive moment $M_{max}$ was not attained in the decision 17, the set point voltage ${}_2V_{set}$ is fixed at the same value as ${}_1V_{set}$. This is followed by method step 8 in which the counter reading Z is increased by "1". The set point ${}_2V_{set}$ results in the subsequent output 9.

Since the counter reading Z is "3" after the preceding operation, reference is made to method step 3 by the counter reading Z being set, as in the beginning of the method, to "0". The operation proceeds as described hereinbefore.

The set point voltage ${}_2V_{set}$ which results is always the lowest value following a complete cycle in output 9 and is retained throughout a further cycle.

FIG. 2 is a schematic circuit diagram of the drive control with a device for varying the rotational speed of the electric motor 31.

The voltage $V_N$ of the mains or line 32 supplies the electric motor 31 via a rectifier 33. The motor speed is measured by a tachogenerator 22, which is linked mechanically to a non-illustrated motor shaft of the electric motor 31. The tachogenerator 22 generates the actual rotational speed value and makes this value available to a speed controller unit 23. which makes a comparison between the set point 21 and this actual speed value and supplies to a current controller unit 26 an output signal corresponding to the desired control behavior. The current controller unit 26 uses this and the information relating to current level, which is recorded by a current converter 25, to form a control signal for the rectifier 33.

A device 18 receives the nominal value voltage or set point voltage ${}_1V_{set}$ from an input 19 as an input variable. as described hereinbefore, the output variable ${}_2$Vset in the line 21 is formed in the device 18 and made available to the speed controller unit 23 as a set point input variable. The device 18 is well known in the art, being a "single Board Computer SBC 86" of the firm INTEL of Santa Clara, California. Relevant or applicable influencing variables for the output variable ${}_2V_{set}$ in the line 21 may be $V_N$, $V_T$ and $V_M$ (N being short for network, T for temperature and M for moment). The set point ${}_1V_{set}$ in line 19 is formed by a non-illustrated set point processor which, in its simplest form, may be a potentiometer. The set point voltage ${}_1V_{set}$ in line 19 corresponds to the value of the desired motor speed. The input variable $V_T$ *is generated by a temperature signal processor* 20. *An example of such a temperature signal processor is readily found in the Siemens Handbook "Circuit Examples", Edition* 80/81. This amplifies and matches a test voltage, generated for example by a thermocouple, to an appropriate voltage level. The input variable $V_M$ is generated, in the illustrated embodiment, with the aid of the same current converter 25 which supplies the actual current value for the current controller unit 26.

Figure 3:
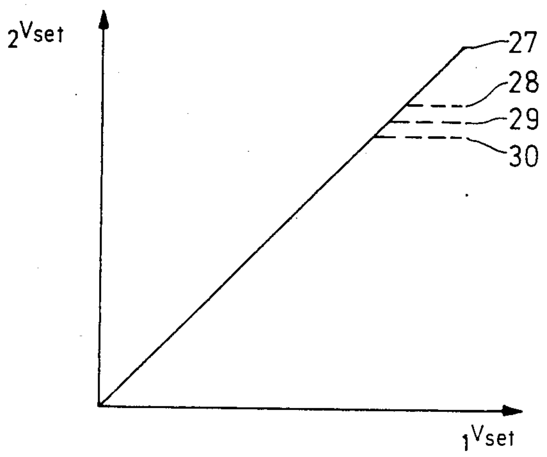
FIG. 3 is a plot diagram showing a characteristic curve of a control unit according to the invention.

FIG. 3 shows a characteristic curve 27 of the set point voltage $_2V_{set}$ as a function of the set point voltage $_1V_{set}$. The continuous characteristic curve 27 represents the path followed by $_2V_{set}$ if the supply voltage, the temperature of the drive elements and the momentary load move within permissible limits. The curves 28, 29 and 30 shown in broken lines represent the paths followed by $_2V_{set}$ if a respective one of the above conditions is not met. The limits for the characteristic curves 28, 29 and 30 of $_2V_{set}$ vary, as described, depending upon the magnitude of the respective deviations.

An optical and/or acoustic alarm indicating that one of the aforementioned characteristics is being met is within the scope of the invention, as is also the possibility of lowering the set point or nominal value manually following an alarm or warning message.

The foregoing is a description corresponding, in substance, to German application P 35 19 840.0, dated June 3, 1985, International priority of which is being claimed for the instant application, and which is hereby made part of this application. Any material discrepancies between the foregoing specification and the specification of the aforementioned corresponding German application are to be resolved in favor of the latter.

There is claimed:

1. Method of controlling at least one electric motor on an offset printing machine by inputting a set point for the rotational speed, which comprises forming a set point for the rotational speed by means of a device for controlling the electric motor, determining a drive moment of the motor and reducing the value of the set point as a function of the drive moment measured when a permissible momentary demand is exceeded.

2. Method of controlling at least one electric motor on an offset printing machine according to claim 1, which comprises reducing the set point for the rotational speed when at least one of the following conditions is met, the line voltage is inadequate, the electric motor exceeds a given temperature, the temperature of the control elements of the electric motor exceeds a given temperature, and the drive moment is exceeded.

3. Method of controlling at least one electric motor on an offset printing machine according to claim 1, wherein the drive moment is determined by means of a strain gauge.

4. Method of controlling at least one electric motor on an offset printing machine according to claim 1, wherein the drive moment is determined by measuring the current of the electric motor.

* * * * *

UNITED STATES PATENT OFFICE
CERTIFICATE OF CORRECTION

PATENT NO. : 4,810,942
DATED : Mar. 7, 1989
INVENTOR(S) : Anton Rodi

It is certified that error appears in the above-identified patent and that said Letters Patent is hereby corrected as shown below:

In the title page, change the name of the inventor from "Anton" to --Rodi--, in item (19), line 2; and in item (75), line 1, change "Rodi Anton" to --Anton Rodi--.

Signed and Sealed this
Fourteenth Day of November, 1989

*Attest:*

JEFFREY M. SAMUELS

*Attesting Officer*

*Acting Commissioner of Patents and Trademarks*